United States Patent Office 3,125,578
Patented Mar. 17, 1964

3,125,578
4-(2',6'-DIOXO-3'-PIPERIDYL)-PIPERIDINES
Paul Adriaan Jan Janssen, Vosselaar, near Turnhout, Belgium, assignor to Research Laboratorium Dr. C. Janssen N.V., a corporation of Belgium
No Drawing. Filed May 17, 1962, Ser. No. 195,404
26 Claims. (Cl. 260—281)

This invention relates to a new series of organic compounds, generally definable as 1-$R_1$-4-(2,6-dioxo-3-$R_2$-3-piperidyl)-piperidines and their corresponding therapeutically active nontoxic acid addition salts.

$R_1$ stands for benzyl, lower alkyl from 1 to 7 carbons, cinnamyl, phenyl-but-3-enyl, thienyl-alk, N-anilino-carbonyl-alk, pyridyl-alk, N-anilino-alk, phenyl-alk, phenyl-hydroxy-alk, halo-benzyl, halo-benzoyl-alk, phenoxy-alk, benzoyl-alk, alk-benzyl, di-alk-benzyl, alko-phenoxy-alk and alk-phenoxy-alk where halo is bromo, fluoro, iodo or chloro, alk is lower alkyl from 1 to 4 carbons and alko is lower alkoxy from 1 to 4 carbons.

$R_2$ stands for phenyl, alko-phenyl, alk-phenyl, di-alk-phenyl, pyridyl and halo phenyl where alk, alko and halo have the meanings given for $R_1$ substituents (supra).

To prepare the novel compounds, the appropriate 1-$R_1$-4-(1,3-dicyano-1-$R_2$-propyl)-piperidine is cyclized before or after the desired group has been introduced on the N-piperidine moiety. In cases where subsequent hydrogenation, cyanoethylation, and ring closure do not cause undesirable side reactions, a more direct approach can be taken by starting with the appropriately substituted 4-piperidone, replacing the keto group with a cyano-aryl-methene, hydrogenating the latter and cyano alkylating the resultant compound.

Introduction of the desired $R_1$ moiety into the piperidine nucleus on the nitrogen atom takes place by reacting the halogenated, i.e. brominated or chlorinated compound, with the piperidine. This may be done prior or subsequent to the cyclization step. Done prior to cyclization, the carbon on the 4-position is also first cyanoalkylated by treatment with an unsaturated nitrile. During this step the nitrogen atom is protected by, for example, a benzyl group which is subsequently removed by hydrogenation.

The intermediate 1-$R_1$-4-(1,3-dicyano-1-$R_2$-propyl)-piperidines are prepared by treating the appropriate 1-$R_1$-4-($\alpha'$-cyano-$R_2$)-piperidine with a cyano alkylating agent, e.g. acrylonitrile, in the presence of a basic catalyst and an organic solvent. This treatment requires appropriate prior protection of the cyclic piperidine nitrogen, as for example, by a benzyl group. The resulting compound may then be dibenzylated, if desired, and the piperidine nitrogen substituted with another group by reaction with the appropriate halo derivative of the incoming function under basic conditions, in the presence of an organic solvent. Alternatively, one may start with the N-unsubstituted dicyano compound and react it with the appropriate halogenated reactant as above noted.

Cyclization of the N-unsubstituted-(1,3-dicyano-1-$R_2$-propyl)-piperidine may be accomplished under acidic conditions to give the corresponding (2,6-dioxo-3-$R_2$-3-piperidyl)-piperidine. The reaction is commenced under low temperature conditions, the mixture is heated to a temperature in excess of 100° C., held at this temperature for a period of time until the reaction is complete, then cooled, treated with base and the desired compound extracted into an organic solvent.

The compounds of this invention may be converted to their therapeutically useful acid addition salts by reaction with an appropriate acid as, for example, an inorganic acid such as hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxy-benzoic or 2-acetoxy-benzoic acid.

Depending upon the conditions employed during the course of the reaction, the novel compounds are obtained either in the form of the free bases or salts thereof. The salts are converted to the free bases in the usual manner, e.g. by reaction with alkali such as sodium or potassium hydroxide. The bases can be converted to their therapeutically useful acid addition salts by reaction with an appropriate organic or inorganic acid.

Acids useful to effect cyclization are, advantageously, mixtures of an inorganic acid such as phosphoric, hydrochloric or, preferably, sulfuric and a weak, lower fatty acid such as formic, propionic, butyric or, preferably, acetic.

Although primary and secondary amines function as their own catalysts in the specialized Michael reaction, cyanoalkylation of the 4-carbon atoms on the tertiary piperidine is advantageously conducted in the presence of a basic catalyst, e.g. an alkali metal lower alkoxide, i.e. sodium or potassium methoxide, ethoxide, propoxide or butoxide. Sodium ethoxide is preferred.

As an organic solvent for this reaction one may employ a hydrocarbon solvent or its ether or ester counterpart as, for example, diethylether, benzene, toluene, xylene, hexane, heptane, tetrahydrofuran or, preferably, dioxane.

Debenzylation of the N-benzyl piperidines is preferential, i.e. the benzyl group on such compounds is removed first by means of hydrogen activated by palladium on charcoal catalyst. Then reduction of the cyclic-extracyclic carbon-carbon linkage on the 4-position of the piperidine may be effected by similar means or by any one of a variety of other reducing agents, for example hydrogen catalytically activated, platinum, or nickel catalyst such as platinum oxide or Raney nickel; hydrogen in statu nascendi, that is a reduction with metals and acids, e.g. iron, zinc or tin, such as zinc and acetic acid; with alkali metals and alcohols, e.g. sodium and ethanol or butanol; with sodium and moist ether; with sodium or aluminum amalgam and the appropriate solvent, or with di-light metal hydrides such as lithium aluminum hydride, sodium aluminum hydride, magnesium hydride in the presence of a catalyst such as $AlCl_3$. Furthermore, the reduction may be performed with reducing agents such as stannous chloride, ferrous sulfate, etc., or, if desired, electrolytically.

Alkylation of the ring nitrogen is advantageously accomplished by treatment with the appropriate, functionally converted halogenated hydrocarbon or aromatic compound in the presence of an alkali metal carbonate or bicarbonate and preferably in an inert solvent medium such as a lower alkanol, e.g. methanol, ethanol, propanol or n-butanol, either singly or in admixture with another solvent such as 4-methyl-2-pentanone. Hydroxyalkylation of the ring nitrogen is suitably effected by reaction with the appropriate oxide, e.g. 1,2-epoxyethyl compound, under reflux conditions in the presence of an organic solvent. This results in ring scission with simultaneous conversion of the oxo function into a hydroxy group.

The novel piperidines of this invention are atropine-like substances of medium to high potency. Anticholinergic activity is demonstrated at concentrations varying from 2.0 to >100 gamma per ml. on isolated rabbit intestine in Tyrode's solution at 37° C. Spontaneous and acetylcholine-induced contractions are recorded kymographically using atropine sulfate as a reference. The ratio of the amplitude of the acetylcholine-induced contractions prior to and after drug addition is a criterium for its inhibition. The $ED_{50}$ is the concentration (gamma/100 ml.) which produces a 50% prohibition of the acetylcholine-induced contractions of the isolated duodenum. Anticholinergic potency is evaluated by comparison with the atropine effect. These compounds are potent inhibitors of experimentally produced gastric ulceration in Wiston rats.

The preferred compounds of the novel series are those having the most potent anticholinergic activity and include especially those where $R_1$ is benzyl or substituted benzyl. Those compounds of the series where $R_1$ is benzoyl alkyl, cinnemyl, phenoxy alkyl, phenyl alkyl, N-anilino-carbonyl-methyl, N-anilino-ethyl, etc., exhibit antihistaminic activity at concentrations ranging from 25 to <100 gamma/100 ml. This property is determined on isolated guinea pig intestine using diphenhydramine hydrochloride as a standard reference for comparison and a routine dose of 1 ml. of a 50 gamma/ml. aqueous solution of histamine hydrochloride at a concentration of $5 \times 10^{-7}$.

*Example I*

400 parts glacial acetic acid are cooled to 10 to 20° C. Then there are added first dropwise 300 parts concentrated sulfuric acid followed by portionwise addition of 50 parts dl-1-benzyl-4-(1,3-dicyano-1-phenylpropyl)-piperidine-hydrochloride at the same temperature. After the addition is complete, the whole is heated to 125° C. in the course of fifteen to twenty minutes. This temperature is then maintained for ten minutes. After cooling, the reaction mixture is poured into ice, alkalized with $NH_4OH$ at a temperature <20° C. and extracted with chloroform. The chloroform layer is first washed twice with a $K_2CO_3$ 5% solution, and then washed twice with water, dried over $MgSO_4$, filtered and evaporated. The residue is dissolved in a mixture of 320 parts acetone and 600 parts diisopropylether, filtered and HCl gas is introduced into the filtrate. The solid hydrochloride is filtered off and dried, to yield 43 parts less pure 1-benzyl-4-(2,6-dioxo - 3 - phenyl - 3 - piperidyl)-piperidine hydrochloride, melting point 283–294° C.

A sample of 4 parts is recrystallized from a boiling mixture of 80 parts isopropanol, 40 parts methanol and 500 parts water. The whole is filtered and after cooling the filtrate overnight at −20° C., 1-benzyl-4-(2,6-dioxo-3-phenyl-3-piperidyl)-piperidine hydrochloride is obtained, melting point 299–301.5° C., as a white amorphous powder.

*Example II*

To 76 parts anhydrous glacial acetic acid are added dropwise 38 parts concentrated sulfuric acid (while cooling: temperature <10° C.). After the addition is complete, 7.6 parts dl - 4 - (1,3-dicyano-1-phenylpropyl)-1-methylpiperidine hydrochloride are added portionwise. The whole is heated for ten minutes at 125° C. to 130° C. After cooling to 30° C., the reaction mixture is poured into ice. The whole is alkalized with $NH_4OH$ at a temperature of <20° C. and extracted with chloroform. The organic layer is washed successively twice with 300 parts $K_2CO_3$ solution 5% and twice with 300 parts water. The chloroform is dried over $MgSO_4$, filtered and evaporated. The residue is dissolved in a mixture of 40 parts acetone and 120 parts diisopropylether, filtered and HCl is introduced into the filtrate. The solid hydrochloride is filtered off, washed with diisopropylether, filtered and dried, to yield crude dl - 4 - (2,6 - dioxo - 3 - phenyl-3-piperidyl)-1-methylpiperidine hydrochloride.

This crop is dissolved in a mixtuse of 64 parts acetone and 24 parts isopropanol and filtered. The filtrate is evaporated at rom temperature, to yield dl-4-(2,6-dioxo-3 - phenyl-3-piperidyl)-1-methylpiperidine hydrochloride, melting point 250–272° C., as a white granular powder.

*Example III*

78 parts glacial acetic acid are cooled to 10 to 20° C. Then there are added first 38 parts concentrated sulfuric acid followed by portionwise addition of 7.6 parts dl-4-(1,3-dicyano-1-pnenylpropyl) - 1 - methylpiperidine at the same temperature. After the addition is complete, the whole is heated to 125° C. in the course of fifteen minutes. This temperature is then maintained for another ten minutes. After cooling, the reaction mixture is poured into 300 parts ice, alkalized with $NH_4OH$ at a temperature <20° C. and extracted twice with 375 parts chloroform. The organic layer is washed first twice with 200 parts of a 5% $K_2CO_3$ solution and twice with water. The chloroform is dried over $MgSO_4$, filtered and the filtrate is evaporated. The oily residue is treated with 24 parts acetone and the whole is evaporated under diminished pressure. The solid residue is triturated in 8 parts acetone, yielding crude dl - 4 - (2,6 - dioxo - 3 - phenyl - 3 - piperidyl)-1-methylpiperidine. This crop is recrystallized from a mixture of 20 parts diisopropylether and 8 parts acetone. After cooling to −20° C., dl - 4 - (2,6 - dioxo-3 - phenyl - 3 - piperidyl) - 1 - methylpiperidine is obtained, melting point 140–143.5° C., as a white amorphous powder.

*Example IV*

76 parts glacial acetic acid are cooled to <25° C. Then there are added first by dropwise addition 38 parts concentrated sulfuric acid, followed by portionwise addition of 10.2 parts of dl-1-benzyl-4-[1,3-dicyano-1-(4-methoxyphenyl)-propyl]-piperidine. After the addition is complete, the whole is heated to 125–130° C. in the course of fifteen minutes. This temperature is then maintained for another fifteen minutes. After cooling to about 30° C., the reaction mixture is poured into 200 parts ice-water. The whole is alkalized with $NH_4OH$ (temperature <25° C.) and extracted three times with chloroform. The organic layer is washed first three times with a 5% $K_2CO_3$ solution and further twice with water. It is dried over $MgSO_4$, filtered and evaporated. The residue is dissolved in a mixture of 160 parts acetone and 120 parts diisopropylether, filtered and HCl gas is introduced into the filtrate. The precipitated solid hydrochloride is filtered off and dried immediately, yielding dl-1-benzyl-4-[2,6 - dioxo - 3 - (4 - methoxyphenyl) - 3 - piperidyl]-piperidine hydrochloride, melting point 187–248.5° C. (dec.), as a pale grey, granular powder.

*Example V*

65 parts glacial acetic acid are cooled to <20° C. Then there are added first dropwise 32 parts concentrated sulfuric acid, followed by portionwise addition of 8 parts dl - 4 - (1,3 - dicyano - 1 - phenylpropyl) - 1 - (2 - phenylethyl)-piperidine. After the addition is complete, the whole is heated to 125–130° C. in the course of thirteen minutes. This temperature is maintained for another seventeen minutes. After cooling to <20° C., the reaction mixture is alkalized with $NH_4OH$ and extracted with chloroform. The organic layer is washed twice with 200 parts of a 5% $K_2CO_3$ solution and then twice with 200 parts water. It is dried over $MgSO_4$, filtered and evaporated. The residue is dissolved in a mixture of 120 parts acetone and 80 parts diisopropylether and HCl gas is introduced into the solution. The precipitated solid hydrochloride is filtered off and dried immediately, to yield the product. This crop is dissolved in a boiling mixture of 200 parts isopropanol, 100 parts methanol and 6 parts water and filtered. After cooling the filtrate overnight at 0° C., dl - 4 - (2,6 - dioxo - 3 - phenyl - 3 - piperidyl)-1-(2-phenylethyl)-piperidine hydrochloride is obtained, melting point 290–294.8° C., as a pale grey, amorphous powder.

*Example VI*

To a cooled mixture of 64 parts glacial acetic acid and 32 parts concentrated sulfuric acid are added 8 parts dl-1-benzyl-4-[1,3-dicyano-1-(3-methylphenyl)-propyl]-piperidine (no exothermic reaction). After the addition is complete, the whole is heated at 130° C. for fifteen minutes. After cooling to 20° C., the reaction mixture is poured into 150 parts ice. The whole is alkalized with NH₄OH at a temperature of 25° C. (a precipitate is formed), and extracted twice with 320 parts chloroform. The organic layer is dried over MgSO₄ and evaporated. The oily residue is dissolved in a mixture of 240 parts diisopropylether and 240 parts ether. This solution is dried over K₂CO₃ and HCl gas is introduced into it. The precipitated hydrochloride is filtered off and dried immediately, yielding 6.6 parts crude dl-1-benzyl-4[2,6 - dioxo - 3-(3-methylphenyl)]-3-piperidyl]-piperidine hydrochloride. This crop is dissolved in 200 parts boiling water and this solution is treated wtih activated charcoal. The charcoal is filtered off and the filtrate is cooled, alkalized with NH₄OH and extracted with 160 parts ether. The organic layer is dried over K₂CO₃ and evaporated. The solid residue is dried, yielding dl-1-benzyl-4-[2,6 - dioxo - 3-(3-methylphenyl)-3-piperidyl]-piperidine, melting point 98–111° C., as a white granular powder.

*Example VII*

To 80 parts glacial acetic acid are added 40 parts sulfuric acid 90% while cooling. Then there are added 10 parts dl - 1-benzyl - 4-[1,3-dicyano-1-(4-methylphenyl)-propyl]-piperidine hydrochloride, at a temperature of 20° C. After the addition is complete, the whole is heated for ten minutes at 130° C., while stirring. After cooling, the reaction mixture is poured into 100 parts ice. The whole is alkalized with NH₄OH. The formed precipitate is filtered off and dissolved in 300 parts chloroform. The organic layer is dried over Na₂SO₄, filtered and evaporated. The oily residue is dissolved in diisopropylether and a few drops of acetone are added. The whole is filtered and HCl gas is introduced into the filtrate. The precipitated salt is filtered and dried yielding dl-1-benzyl-4 - [2,6-dioxo-3-(4-methylphenyl)-3-piperidyl]-piperidine hydrochloride, melting point 192–196° C., as a white granular powder.

*Example VIII*

A mixture of 50 parts anhydrous acetic acid and 45 parts sulfuric acid 90% is cooled to room temperature in an ice-bath. Then there are added portionwise 5.7 parts dl - 1-(4-chlorobenzyl)-4-(1,3-dicyano-1-phenylpropyl)-piperidine. After the addition is complete, the reaction mixture is warmed to 130° C. in an oil-bath and stirred for fifteen minutes, when complete solution is effected. After cooling to room temperature, the acid mixture is cautiously poured onto 80 parts ice in an excess of aqueous ammonia. The reaction product is extracted twice with 430 parts chloroform and the combined chloroform layers are washed successively with 2×250 parts of a 5% K₂CO₃ solution and 2×250 parts water. The chloroform extract is then dried over 20 parts K₂CO₃, filtered and evaporated to dryness. The oily residue is dissolved in a mixture of 400 parts diisopropylether and 40 parts acetone, and this solution is saturated with dry HCl gas. The precipitated salt is collected on a Buchner funnel and dried overnight under reduced pressure at 120° C. to yield dl-1-(4 - chlorobenzyl) - 4-(2,6-dioxo-3-phenyl-3-piperidyl)-piperidine hydrochloride, melting point 160–180° C. (dec.), as a nearly white granular powder.

*Example IX*

To a chilled mixture of 64 parts anhydrous acetic acid and 57.6 parts sulfuric acid 90% are added portionwise 8.15 parts dl-1-benzyl-4-[1,3-dicyano-1-(4-ethylphenyl)-propyl]-piperidine hydrochloride, while cooling. After the addition is complete, the whole is stirred and refluxed for fifteen minutes at 125–130° C. After cooling to 20° C., the reaction mixture is poured into 100 parts crushed ice. The whole is alkalized with ammonium hydroxide at a temperature below 30° C.: a solid is precipitated. This is filtered off and triturated in 50 parts warm water (40° C.). The precipitate is filtered off, dried under reduced pressure at 80° C., whereupon it liquifies, but after cooling it solidifies again: 7.2 parts product are obtained. This crop is dissolved in a mixture of 320 parts diisopropylether and 80 parts acetone and gaseous hydrochloric acid is introduced into the solution. The precipitated hydrochloride (solid) is filtered off, yielding the crude hydrochloride. This crop is boiled in 80 parts 4-methyl-2-pentanone: an oil is obtained, which solidifies again on standing at room temperature, yielding crude dl-1-benzyl-4 - [2,6 - dioxo-3-(4-ethylphenyl)-3-piperidyl]-piperidine hydrochloride, melting point 165–195° C. (dec.). After cooling the filtrate overnight at —20° C., dl-1-benzyl-4-[2,6 - dioxo-3-(4-ethylphenyl)-3-piperidyl]-piperidine hydrochloride is obtained, melting point 145–160° C. (dec.), as a white amorphous powder.

*Example X*

34.2 parts sulfuric acid 90% are added dropwise to 38 parts anhydrous acetic acid, while cooling. Then there are added 4.8 parts dl-1-benzyl-4-[1,3-dicyano-1-(3,4-dimethylphenyl)propyl] - piperidine hydrochloride. After the addition is complete, the whole is heated to 125–130° C. While maintaining this temperature, the whole is stirred for fifteen minutes. After cooling to room temperature, the reaction mixture is poured into 60 parts crushed ice. The whole is alkalized with ammonium hydroxide at a temperature below 30° C., whereupon a solid is precipitated. This is filtered off and triturated in a mixture of 56 parts diisopropylether and 16 parts acetone. The whole is filtered and after cooling overnight at —20° C., a solid product is deposited. This is filtered off and the filtrate is diluted with 320 parts diisopropylether and gaseous hydrochloric acid is introduced into the solution. A semisolid hydrochloride is filtered off. This crop is boiled in 120 parts 4-methyl-2-pentanone. The undissolved part is filtered off and it is recrystallized from 64 parts boiling acetone. After cooling for forty-eight hours at 0° C., dl-1-benzyl-4-[3-(3,4-dimethylphenyl)-2,6-dioxo-3-piperidyl]-piperidine hydrochloride is obtained, melting point 200.4–211.4° C. (dec.), as a white amorphous powder.

*Example XI*

66.5 parts sulfuric acid 90% are added dropwise to 80 parts anhydrous acetic acid, while cooling. Then there are added 11 parts dl-1-benzyl-4-[1,3-dicyano-1-(2-pyridyl)-propyl]-piperidine dihydrochloride. After the addition is complete, the whole is heated for fifteen minutes at 125–130° C. After cooling, the reaction mixture is poured into crushed ice and the whole is alkalized with ammonium hydroxide, whereupon a precipitate is formed. It is filtered off and dissolved in a mixture of 160 parts diisopropylether and 20 parts acetone. The whole is filtered and gaseous hydrogen chloride is introduced into the filtrate. The precipitated hydrochloride is filtered off and dried, yielding the product. This crop is dissolved in 60 parts boiling 2-propanol and gaseous hydrogen chloride is introduced into the solution. After cooling for two hours at 0° C., the crude hydrochloride is filtered off. This fraction is recrystallized from a mixture of 100 parts 2-propanol and 8 parts water. After cooling overnight at 0° C., the product is obtained. From this crop the free base is liberated by alkalization of the aqueous solution with excess of ammonium hydroxide. The precipitated solid is filtered off and dried, to yield dl-1-benzyl-4-[2,6-dioxo-3-(2-pyridyl)-3-piperidyl]- piperidine, melting point 103.6–104.4° C., as a pale yellow granular powder.

*Example XII*

1182 parts sulfuric acid 90% are added dropwise to 1314 parts anhydrous acetic acid, while cooling. Then there are added 200 parts dl-1-benzyl-4-(1,3-dicyano-1-phenylpropyl)-piperidine. After the addition is complete, the whole is heated for ten minutes at 125° C. After cooling, the reaction mixture is poured into crushed ice and the whole is alkalized with ammonium hydroxide, whereupon an oil is precipitated. It is filtered off and dissolved in a boiling mixture of 480 parts acetone and 760 parts diisopropylether. The undissolved part is filtered off, yielding 1-benzyl-4-(2,6-dioxo-3-phenyl-3-piperidyl)-piperidine, melting point 156–159° C. On further cooling the filtrate at −20° C., a second crop of 1-benzyl-4-(2,6-dioxo-3-phenyl-3-piperidyl)-piperidine is obtained, melting point 155–157.6° C.

The mother liquor is concentrated to a volume of 300 parts. After cooling overnight to −20° C., a third fraction of 1-benzyl-4-(2,6-dioxo-3-phenyl-3-piperidyl)-piperidine is filtered off, melting point 152.5–155° C. On further keeping the filtrate for five hours at room temperature, another portion of 1-benzyl-4-(2,6-dioxo-3-phenyl-3-piperidyl)-piperidine is filtered off, melting point 143.8–145° C.

*Example XIII*

To a stirred mixture of 5.4 parts dl-4-(2,6-dioxo-3-phenyl-3-piperidyl)-piperidine, 5.3 parts sodium carbonate, a few crystals of potassium iodide, 80 parts n-butanol and 80 parts 4-methyl-2-pentanone is added a solution of 3.8 parts cinnamyl chloride in 20 parts n-butanol and 20 parts 4-methyl-2-pentanone. After the addition is complete, the whole is stirred and refluxed for fifty hours. After cooling, 50 parts water are added. The organic layer is separated, dried over $K_2CO_3$, filtered and evaporated. The solid residue is triturated in diisopropylether, yielding dl-1-cinnamyl-4-(2,6-dioxo-3-phenyl-3-piperidyl)-piperidine, melting point 154.2–159° C., as a yellow amorphous powder.

*Example XIV*

A mixture of 4.5 parts 1-bromo-heptane, 5.4 parts dl-4-(2,6-dioxo-3-phenyl-3-piperidyl)-piperidine, 3.3 parts sodium carbonate, a few crystals of potassium iodide, 100 parts 4-methyl-2-pentanone and 100 parts n-butanol is stirred and refluxed for forty-eight hours. After cooling, 50 parts water are added. The organic layer is separated, dried over $K_2CO_3$ and evaporated. The oily residue is dissolved in diisopropylether and evaporated again. This treatment is repeated twice, whereupon a solid residue is obtained. This is recrystallized from a mixture of 20 parts diisopropylether and 8 parts acetone, yielding dl-4-(2,6-dioxo-3-phenyl-3-piperidyl)-1-heptylpiperidine, melting point 139.5–141.6° C., as a white amorphous powder.

*Example XV*

A mixture of 3.2 parts 1-bromo-butane, 5.4 parts dl-4-(2,6-dioxo-3-phenyl-3-piperidyl)-piperidine, 3.3 parts sodium carbonate, a few crystals of potassium iodide, 100 parts 4-methyl-2-pentanone and 100 parts n-butanol is stirred and refluxed for forty-eight hours. After cooling, 50 parts water are added. The organic layer is separated, dried over $K_2CO_3$ and evaporated. The oily residue is dissolved twice in diisopropylether and evaporated again. The solid residue is filtered off and dried, to yield the crude product. This crop is dissolved in 52 parts boiling acetone. After cooling to −20° C., dl-1-butyl-4-(2,6-dioxo-3-phenyl-3-piperidyl)-piperidine is obtained, melting point 138–142° C., as a white amorphous powder.

*Example XVI*

A mixture of 8 parts 4-chloro-p-fluoro-butyrophenone, 5.4 parts dl-4-(2,6-dioxo-3-phenyl-3-piperidyl)-piperidine, 3.2 parts sodium carbonate, a few crystals of potassium iodide in 100 parts 4-methyl-2-pentanone and 100 parts n-butanol is refluxed for sixty hours. After cooling, 50 parts water are added. The organic layer is separated, dried over $K_2CO_3$ and evaporated. The residue is dissolved in a mixture of 400 parts diisopropylether and 160 parts ether, the formed precipitate is filtered off and HCl gas is introduced into the filtrate. The formed sticky precipitate is dried under reduced pressure, yielding crude dl-4-(2,6-dioxo-3-phenyl-3-piperidyl)-1-[3-(4-fluoro-benzoyl)-propyl]-piperidine hydrochloride. This crop is boiled in 40 parts isopropanol. On keeping at room temperature, the formed precipitate is filtered off, yielding dl-4-(2,6-dioxo-3-phenyl-3-piperidyl)-1-[3-(4-fluoro-benzoyl)-propyl]-piperidine hydrochloride, melting point 231–235° C., as a white amorphous powder.

*Example XVII*

To a stirred mixture of 5.85 parts dl-4-(2,6-dioxo-3-phenyl-3-piperidyl)-piperidine, 3.2 parts sodium carbonate, a few crystals of potassium iodide in 80 parts 4-methyl-2-pentanone and 80 parts n-butanol is added a solution of 3.8 parts 5-chloro-1-phenyl-1-butene in 20 parts 4-methyl-2-pentanone and 20 parts n-butanol. After the addition is complete, the whole is stirred and refluxed for sixty hours. After cooling, 50 parts water are added. The aqueous layer is separated, and washed with 40 parts ether. The combined organic layers are dried over $K_2CO_3$, filtered and evaporated. The oily residue solidifies on evaporating and scratching in diethylether, yielding dl-4-(2,6-dioxo-3-phenyl-3-piperidyl) - 1-(4-phenyl-but-3-enyl)-piperidine, melting point 151–153.2° C., as a grey-white amorphous powder.

*Example XVIII*

A mixture of 4.8 parts 1-bromo-2-phenoxyethane, 5.4 parts dl-4-(2,6-dioxo-3-phenyl-3-piperidyl)-piperidine, 3.2 parts sodium carbonate, a few crystals of potassium iodide in 100 parts 4-methyl-2-pentanone and 100 parts n-butanol is stirred and refluxed for forty-eight hours. After cooling, 50 parts water are added. The organic layer is separated, dried over $K_2CO_3$ and evaporated. The residue is dissolved in a mixture of 400 parts ether and 24 parts chloroform. The organic layer is dried over $K_2CO_3$ and HCl gas is introduced into it. The precipitated solid hydrochloride is filtered off and dried, to yield crude dl-4-(2,6-dioxo-3-phenyl-3-piperidyl) - 1 - (2 - phenoxyethyl)-piperidine hydrochloride.

The crop is dissolved in 100 parts boiling water, and the solution is treated with activated charcoal. The charcoal is filtered off and after cooling the filtrate is alkalized with $NH_4OH$ and extracted with ether. The organic layer is dried over $K_2CO_3$ and evaporated, yielding dl-4-(2,6-dioxo-3-phenyl-3-piperidyl) - 1 - (2 - phenoxyethyl)-piperidine, melting point 78–90° C., as a white flaky powder.

*Example XIX*

To a mixture of 5.85 parts dl-4-(2,6-dioxo-3-phenyl-3-piperidyl)-piperidine, 3.2 parts sodium carbonate, a few crystals of potassium iodide in 125 parts 4-methyl-2-pentanone is added dropwise a solution of 4.4 parts benzoyl-bromo-methane in 125 parts n-butanol. After the addition is complete, the whole is stirred and refluxed for twelve hours. After cooling, 100 parts water are added. The formed precipitate is filtered off. From the filtrate the organic layer is separated, dried over $K_2CO_3$, filtered and evaporated. The solid residue is washed with diisopropylether, filtered off again and dried, yielding the product. This fraction is recrystallized from a mixture of 40 parts isopropanol and 24 parts acetone. After cooling overnight at −20° C., the crude free base is filtered off, melting point 159–163° C. The combined mother liquors of the two fractions are diluted with isopropanol and acetone and HCl gas is introduced into it, yielding dl-1-(benzoylmethyl)-4-(2,6-dioxo-3-phenyl-3-piperidyl)-piperidine hydrochloride, melting point 281–282° C., as a grey-white amorphous powder.

*Example XX*

A mixture of 44 parts cinnamyl chloride, 7.2 parts dl-4-[2,6-dioxo - 3 - (4-fluoro-phenyl)-3-piperidyl]-piperidine, 4 parts sodium carbonate, a few crystals of potassium iodide in 125 parts 4-methyl-2-pentanone and 125 parts n-butanol is stirred and refluxed for sixty hours. After cooling, 50 parts water are added. The organic layer is separated, dried over $K_2CO_3$ and evaporated. The residue is boiled in a mixture of 400 parts ether and 75 parts chloroform. The formed precipitate is filtered off.

The filtrate is dried over $K_2CO_3$ and HCl gas is introduced into it. The precipitated solid hydrochloride is filtered off and dried immediately, yielding dl-1-cinnamyl-4 · [2,6-dioxo-3-(4-fluoro-phenyl)-3-piperidyl]-piperidine hydrochloride hydrate, melting point 170→215° C. (dec.), as a beige granular powder.

*Example XXI*

A mixture of 5.8 parts 1-bromo-2-phenoxyethane, 7.1 parts dl-4-[2,6-dioxo-3-(3-methylphenyl) - 3 - piperidyl]-piperidine, 4 parts sodium carbonate, a few crystals of potassium iodide in 125 parts 4-methyl-2-pentanone and 125 parts n-butanol is stirred and refluxed for sixty hours. After cooling, 50 parts water are added. The organic layer is separated, dried over $K_2CO_3$, filtered and evaporated. The oily residue is dissolved in a mixture of acetone and ether and HCl gas is introduced into the solution. An oily hydrochloride is obtained. The whole is evaporated to dryness. The residue is dissolved in boiling water and this solution is treated with activated charcoal. After filtering and cooling, the whole is alkalized and the formed precipitate is filtered off, yielding the crude free base. This product is dissolved in a mixture of diisopropylether and acetone. After treating the hot solution with activated charcoal it is filtered and after cooling HCl gas is introduced into the solution. The solvent is decanted from the precipitated oily hydrochloride. This is triturated in a mixture of ether and acetone and filtered, to yield dl-4-[2,6-dioxo-3-(3-methylphenyl)-3-piperidyl]-1-(2 - phenoxyethyl)-piperidine hydrochloride, melting point 132→233° C. (dec.), as a pale yellow powder.

*Example XXII*

A mixture of 4 parts 1-chloro-2-phenylethane, 7.1 parts dl-4-[2,6-dioxo - 3 - (3-methylphenyl)-3-piperidyl]-piperidine, 4 parts sodium carbonate, a few crystals of potassium iodide in 100 parts 4-methyl-2-pentanone and 100 parts n-butanol is stirred and refluxed for sixty hours. After cooling, 50 parts water are added. The organic layer is separated, dried over $K_2CO_3$, filtered and evaporated. The solid residue is washed with 40 parts diisopropylether, filtered off again and dried, yielding the product. This fraction is dissolved in a mixture of 240 parts diisopropylether and 40 parts acetone and HCl gas is introduced into the solution. The precipitated hydrochloride is filtered off and dried, yielding dl-4-[2,6-dioxo-3-(3-methylphenyl)-3-piperidyl]-1-(2-phenylethyl)-piperidine hydrochloride, melting point 308° C. (dec.), as a pale yellow amorphous powder.

*Example XXIII*

A mixture of 5.8 parts 1-bromo-2-phenoxyethane, 7.2 parts dl - 4 - [2,6-dioxo-3-(4-fluoro-phenyl)-3-piperidyl]-piperidine, 4 parts $Na_2CO_3$ and 0.1 part KI in 100 parts n-butanol and 100 parts hexone is refluxed with stirring for sixty hours. The mixture is cooled to room temperature, 50 parts water are added and the layers are separated. The organic layer is dried over 10 parts $K_2CO_3$, filtered and the solvent removed under reduced pressure on the water bath. The oily residue is dissolved in 350 parts diethylether, dried over 10 parts $K_2CO_3$ and the filtered solution saturated with dry HCl gas. The precipitated salt is filtered and dissolved in 100 parts water. This solution is treated with charcoal, and alkalinized with excess $NH_4OH$. The free base is extracted with 3×50 parts diethylether. The combined extracts are dried over 10 parts $K_2CO_3$ and the solvent is removed under reduced pressure. The residue is dissolved in 350 parts diisopropylether, and dry HCl gas is passed into this solution. The precipitated solid is filtered on a Buchner filter and recrystallized from 25 parts acetone at −20° C. The solid is filtered off and dried to yield dl-4-[2,6-dioxo-3-(4-fluoro-phenyl)-3-piperidyl]-1-(2-phenoxyethyl)-piperidine hydrochloride, melting point 150→175° C., as a white amorphous powder.

*Example XXIV*

To 5.6 parts dl-4-(2,6-dioxo-3-phenyl-3-piperidyl)-piperidine, 6.4 parts sodium carbonate, a few crystals of potassium iodide in 80 parts 4-methyl-2-pentanone and 80 parts n-butanol is added dropwise a solution of 3.2 parts 2-methyl-benzylchloride in 20 parts 4-methyl-2-pentanone and 20 parts n-butanol. After the addition is complete, the whole is stirred and refluxed for twenty-four hours. After cooling, 50 parts water are added. The organic layer is separated, dried over $K_2CO_3$, filtered and the solvent is removed under reduced pressure.

The residue is treated with 30 parts diisopropylether and solidified immediately. The solid precipitate is filtered off and dried to yield dl-4-(2,6-dioxo-3-phenyl-3-piperidyl)-1-(2-methylbenzyl)-piperidine, melting point 161–163.4° C., as a light yellow amorphous powder.

*Example XXV*

A mixture of 5.2 parts 1-bromo-3-phenoxypropane, 5.6 parts dl-4-(2,6-dioxo-3-phenyl-3-piperidyl) - piperidine, 3.2 parts sodium carbonate, a few crystals of potassium iodide in 100 parts n-butanol and 100 parts 4-methyl-2-pentanone is stirred and refluxed for sixty hours. After cooling, 50 parts water are added. The organic layer is separated, dried over $K_2CO_3$, filtered and evaporated. The solid residue is extracted with a boiling mixture of 80 parts ether and 80 parts diisopropylether. The undissolved part is filtered off and dried to yield the crude hydrochloride of dl-4-(2,6-dioxo-3-phenyl-3-piperidyl)-1-(3-phenoxypropyl)-piperidine. On cooling the filtrate overnight at 0° C., a solid is precipitated. This is filtered and dried, to yield dl-4-(2,6-dioxo-3-phenyl-3-piperidyl)-1-(3-phenoxypropyl)-piperidine, melting point 141–147° C., as a yellow-white flaky powder.

*Example XXVI*

A mixture of 3.7 parts 3-chloro-benzyl chloride, 5.6 parts dl-4-(2,6-dioxo-3-phenyl-3-piperidyl) - piperidine, 6.4 parts sodium carbonate, a few crystals of potassium iodide in 100 parts 4-methyl-2-pentanone and 100 parts n-butanol is stirred and refluxed for twenty-four hours. After cooling to room temperature, 50 parts water are added. The organic layer is separated, dried over 10 parts $K_2CO_3$, filtered and evaporated to dryness. The solid residue is dissolved in a mixture of 400 parts diisopropylether and 40 parts acetone. This solution yields on saturation with dry HCl gas a precipitate which after recrystallization from 120 parts isopropanol and 4 parts water consists of dl-1-(3-chloro-benzyl)-4-(2,6-dioxo-3-phenyl-3-piperidyl) - piperidine hydrochloride, melting point 295.8–297.4° C., as a white amorphous powder.

A second crop of 0.9 parts less pure material is obtained by cooling the mother liquors from the recrystallization to −150° C., melting point 286–287.5° C.

*Example XXVII*

To a stirred mixture of 5.6 parts dl-4-(2,6-dioxo-3-phenyl-3-piperidyl)-piperidine, 6.4 parts sodium carbonate, a few crystals of potassium iodide, 80 parts 4-methyl-2-pentanone and 80 parts n-butanol is added dropwise a solution of 3.2 parts 4-methylbenzyl chloride in 20 parts 4-methyl-2-pentanone and 20 parts n-butanol. After the addition is complete, the whole is stirred and refluxed for twenty-four hours. After cooling, 50 parts water are added. The organic layer is separated, dried over potassium carbonate and filtered. The filtrate is evaporated. The residue is dissolved in 60 parts acetone and 400 parts diisopropylether, whereupon some solid matter is precipitated. This is filtered off and gaseous hydrochloric acid is introduced into the filtrate. The precipitated hydrochloride is filtered off, yielding the crude product. This crop is boiled in 360 parts 4-methyl-2-pentanone. The undissolved part is filtered off, yielding crude dl-4-(2,6-dioxo-3-phenyl-3-piperidyl)-1-(4-methylbenzyl)-piperidine hydrochloride. This crop is recrystalized from 40 parts boiling 2-propanol filtered and after keeping overnight at room temperature, the formed precipitate is filtered off. It is washed with acetone and dried, for two days at 90° C., yielding dl-4-(2,6-dioxo-3 - phenyl - 3- piperidyl)-1-(4-methylbenzyl)-piperidine hydrochlorine, melting point 258–260° C., as a white amorphous powder.

*Example XXVIII*

A mixture of 2.9 parts 2-(chloro-methyl)-thiophene, 5.6 parts dl-4-(2,6-dioxo-3-phenyl-3-piperidyl)-piperidine, 6.4 parts sodium carbonate, a few crystals of potassium iodide, 100 parts 4-methyl-2-pentanone and 100 parts n-butanol is stirred and refluxed for sixty hours. After cooling, 50 parts water are added. The organic layer is separated, dried over potassium carbonate and evaporated. The oily residue is dissolved in 80 parts acetone and 400 parts diisopropylether. The solution is filtered from insoluble matter and gaseous hydrochloric acid is introduced into the filtrate. The precipitated hydrochloride is filtered off and dried, yielding crude dl-4-(2,6-dioxo-3-phenyl-3-piperidyl) - 1-(2-thienylmethyl)-piperidine hydrochloride. This crop is triturated in 100 parts boiling 2-propanol. The undissolved part is filtered off, yielding dl-4-(2,6-dioxo-3-phenyl-3-piperidyl) - 1-(2-thienylmethyl)-piperidine hydrochloride, melting point 266.2–269° C., as a grey-white amorphous powder.

*Example XXIX*

To a stirred mixture of 5.5 parts dl-4-(2,6-dioxo-3-phenyl-3-piperidyl)-piperidine, 6.4 parts sodium carbonate, a few crystals of potassium iodide, 80 parts 4-methyl-2-pentanone and 80 parts n-butanol is added dropwise a solution of 3.4 parts 4-ethylbenzyl chloride in 20 parts 4-methyl-2-pentanone and 20 parts n-butanol. After the addition is complete, the whole is stirred and refluxed for sixty hours. After cooling, 50 parts water are added. The organic layer is separated, dried over potassium carbonate, filtered and the filtrate is evaporated. The oily residue is dissolved in a mixture of 160 parts diisopropylether and 40 parts acetone. This solution is filtered and gaseous hydrochloric acid is introduced into the filtrate. The solid hydrochloride is filtered off and dried, yielding crude dl - 4 - (2,6-dioxo-3-phenyl-3-piperidyl)-1-(4-ethylbenzyl)-piperidine hydrochloride. The crop is boiled in 160 parts 4-methyl-2-pentanone and the undissolved part is filtered off, yielding crude dl-4-(2,6-dioxo-3-phenyl-3-piperidyl)-1-(4-ethylbenzyl)-piperidine hydrochloride.

The fraction is recrystallized from a mixture of 80 parts 2-propanol and 20 parts methanol. The whole is filtered and after cooling the filtrate overnight at 0° C., dl-4-(2,6-dioxo-3-phenyl-3-piperidyl) - 1-(4-ethylbenzyl)-piperidine hydrochloride is obtained, melting point 276.6–280° C., as a white amorphous powder.

*Example XXX*

To a stirred mixture of 5.5 parts dl-4-(2,6-dioxo-3-phenyl-3-piperidyl)-piperidine, 6.4 parts sodium carbonate, a few crystals of potassium iodide in 80 parts 4-methyl-2-pentanone and 80 parts n-butanol is added dropwise a solution of 3.4 parts 2,5-dimethylbenzyl chloride in 20 parts 4-methyl-2-pentanone and 20 parts n-butanol. After the addition is complete, the whole is stirred and refluxed for thirty hours. After cooling, 50 parts water are added. The organic layer is separated, dried over potassium carbonate, filtered and evaporated. The solid residue is triturated in 80 parts diisopropylether, to yield dl-1-(2,5 - dimethylbenzyl)-4-(2,6-dioxo-3 - phenyl - 3-piperidyl)-piperidine, melting point 184.2–186° C., as grey-brown scales.

*Example XXXI*

A mixture of 3.2 parts 4-fluoro-benzyl chloride, 5.5 parts dl-4-(2,6-dioxo-3-phenyl-3-piperidyl)-piperidine, 6.4 parts sodium carbonate, a few crystals of potassium iodide in 100 parts 4-methyl-2-pentanone and 100 parts n-butanol is stirred and refluxed for twenty-four hours. After cooling, the reaction mixture is filtered and the filtrate is evaporated. The semisolid residue is triturated in 80 parts warm acetone. The undissolved part is filtered off. To the filtrate are added 240 parts diisopropylether and then gaseous hydrochloric acid is introduced into the solution. After keeping at room temperature, the precipitated solid is filtered and dried for two days at 100° C., yielding dl-4-(2,6-dioxo-3-phenyl-3-piperidyl)-1-(4-fluorobenzyl)-piperidine hydrochloride, melting point 279–283.8° C., as a pale yellow amorphous powder.

*Example XXXII*

A mixture of 3.7 parts 1-chloro-4-phenyl-butane, 5.5 parts dl-4-(2,6 - dioxo-3-phenyl - 3 - piperidyl)-piperidine, 6.4 parts sodium carbonate, a few crystals of potassium iodide in 100 parts 4-methyl-2-pentanone and 100 parts n-butanol is stirred and refluxed for sixty hours. After cooling, the reaction mixture is filtered. The organic filtrate is dried over potassium carbonate and evaporated. The oily residue is dissolved in 64 parts diisopropylether and evaporated. The solid residue is triturated in diisopropylether, yielding the product. The crop is boiled in a mixture of 64 parts diisopropylether and 24 parts acetone. The undissolved part is filtered off, yielding the product. This fraction is dissolved in 64 parts boiling acetone. After cooling for two days at 0° C., dl-(2,6-dioxo-3-phenyl-3 - piperidyl)-1-(4-phenylbutyl)-piperidine is filtered off, melting point 149–150° C., as a grey-white amorphous powder.

*Example XXXIII*

A mixture of 4.6 parts 1-bromo-3-phenylpropane, 5.5 parts dl-4-(2,6 - dioxo-3-phenyl - 3 - piperidyl)-piperidine, 5.3 parts sodium carbonate, a few crystals of potassium iodide in 100 parts 4-methyl-2-pentanone and 100 parts n-butanol is stirred and refluxed for sixty hours. After cooling, the reaction mixture is filtered and the filtrate is evaporated. The semisolid residue is dissolved in 120 parts boiling acetone. After cooling overnight at —20° C., dl-4-(2,6 - dioxo-3 - phenyl-3 - piperidyl)-1-(3-phenylpropyl)-piperidine is obtained, melting point 144–146° C., as a white amorphous powder.

*Example XXXIV*

To a stirred mixture of 5.5 parts dl-4-(2,6-dioxo-3-phenyl-3-piperidyl)-piperidine, 5.3 parts sodium carbonate, a few crystals of potassium iodide in 100 parts 4-methyl-2-pentanone and 100 parts n-butanol is added portionwise 4.3 parts 1-anilinocarbonyl-2-chloro-ethane. After the addition is complete, the whole is stirred and refluxed for sixty hours. After cooling, 100 parts water are added. The organic layer is separated and after a short time a solid is precipitated. After standing for thirty minutes at room temperature, this solid is filtered off to yield crude dl-1-[2-(N-anilinocarbonyl)-ethyl]-4-(2,6-dioxo-3-phenyl-3-piperidyl)-piperidine. The crop is recrystallized from 80 parts acetone. After cooling overnight at 0° C., dl-1-[2-(N-anilinocarbonyl)-ethyl]-4-(2,6-dioxo-3-phenyl-3-piperidyl)-piperidine is obtained, melting point 132.6–143° C., as a white granular powder.

*Example XXXV*

A mixture of 5.3 parts 1-bromo-3-(4-methylphenoxy)-propane, 5.5 parts dl-4-(2,6-dioxo-3-phenyl-3-piperidyl)-piperidine, 5.3 parts sodium carbonate, a few crystals of potassium iodide in 100 parts 4-methyl-2-pentanone and 100 parts n-butanol is stirred and refluxed for sixty hours. After cooling, the reaction mixture is filtered and the filtrate is evaporated. The oily residue is dissolved in a mixture of 400 parts diisopropylether and 80 parts acetone. The solution is filtered from insoluble matter and gaseous hydrochloric acid is introduced into the filtrate. A sticky hydrochloride is obtained. The solvent is decanted and evaporated. The whole (residue and sticky hydrochloride) is triturated in 2-propanol, yielding the product. The crop is boiled in 160 parts 4-methyl-2-pentanone. The undissolved part is filtered off (filtrate is set aside), yielding less pure dl-4-(2,6-dioxo-3-phenyl-3-piperidyl)-1-[3-(4 - methylphenoxy)-propyl]-piperidine hydrochloride, melting point 152.6→180° C. (dec.). The filtrate which was set aside is cooled for two hours to —20° C., yielding the product. This crop is boiled in 110 parts 2-propanol. The undissolved part is filtered off to yield dl-4-(2,6-dioxo-3-phenyl-3-piperidyl)-1-[3-(4 - methylphenoxy)-propyl]-piperidine hydrochloride, melting point 154→204° C., as a white amorphous powder.

Example XXXVI

A mixture of 4.4 parts 1-benzoyl-4-chloro-butane, 5.5 parts dl-4-(2,6-dioxo-3-phenyl-3-piperidyl)-piperidine, 5.3 parts sodium carbonate, a few crystals of potassium iodide in 100 parts 4-methyl-2-pentanone and 100 parts n-butanol is stirred and refluxed for sixty hours. After cooling, 70 parts water are added. The organic layer is separated, dried over potassium carbonate, filtered, washed with acetone and evaporated. The oily residue is dissolved in a mixture of 80 parts diisopropylether and 120 parts acetone and the whole is evaporated again. The semisolid residue is dissolved in acetone and evaporated. The residue is then triturated in 40 parts acetone to yield dl-1-(4-benzoylbutyl)-4-(2,6 - dioxo-3-phenyl - 3-piperidyl)-piperidine, melting point 142.4–143.4° C., as a white granular powder.

Example XXXVII

A mixture of 4.7 parts 1-chloro-3-(4-methoxyphenoxy)-propane, 5.5 parts dl-4-(2,6-dioxo-3-phenyl-3-piperidyl)-piperidine, 5.3 parts sodium carbonate, a few crystals of potassium iodide in 100 parts 4-methyl-2-pentanone and 100 parts n-butanol is stirred and refluxed for sixty hours. After cooling, the reaction mixture is filtered and the filtrate is evaporated. The oily residue is dissolved in a mixture of 400 parts diisopropylether and 80 parts acetone. The whole is filtered from insoluble matter and then gaseous hydrochloric acid is introduced into the filtrate: a sticky hydrochloride is obtained. The solvent is decanted and evaporated. This residue, together with the sticky hydrochloride, is triturated in 80 parts boiling 2-propanol, yielding crude dl-4-(2,6-dioxo-3-phenyl-3-piperidyl)-1-[3-(4 - methoxyphenoxy)-propyl]-piperidine hydrochloride. This crop is boiled in 160 parts 4-methyl-2-pentanone. The undissolved part is filtered off, yielding less pure dl-4-(2,6-dioxo-3-phenyl-3-piperidyl)-1-[3-(4 - methoxyphenoxy)-propyl]-piperidine hydrochloride. The crop is recrystallized once more from 240 parts 2-propanol. After cooling for four hours at 0° C., dl-4-(2,6-dioxo-3-phenyl-3 - piperidyl)-1-[3 - (4-methoxyphenoxy)-propyl]-piperidine hydrochloride is obtained, melting point 224–225.2° C., as a white granular powder.

Example XXXVIII

To a stirred mixture of 5.5 parts dl-4-(2,6-dioxo-3-phenyl-3-piperidyl)-piperidine, 5.3 parts sodium carbonate, a few crystals of potassium iodide in 80 parts 4-methyl-2-pentanone and 80 parts n-butanol is added dropwise a solution of 4.2 parts 1-benzoyl-3-chloro-propane in 20 parts 4-methyl-2-pentanone and 20 parts n-butanol. After the addition is complete, the whole is stirred and refluxed for sixty hours. After cooling, 50 parts water are added. The organic layer is separated, dried over potassium carbonate, filtered and the filtrate is evaporated. The semisolid residue is boiled in a mixture of 8 parts diisopropylether and 40 parts acetone. The undissolved part is filtered off, yielding unreacted dl-4-(2,6-dioxo-3-phenyl-3-piperidyl)-piperidine.

The filtrate is diluted with 40 parts acetone and 60 parts diisopropylether. The whole is filtered and gaseous hydrochloric acid is introduced into the filtrate. The precipitated solid hydrochloride is filtered off, to yield crude dl - 1 - (3-benzoylpropyl)-4-(2,6-dioxo-3-phenyl-3-piperidyl)-piperidine hydrochloride. This crop is recrystallized from 38 parts boiling 2-propanol and filtered again. After cooling the filtrate overnight at 0° C., dl-1-(3-benzoylpropyl) - 4 - (2,6-dioxo-3-phenyl-3-piperidyl)-piperidine hydrochloride is obtained, melting point 263.6–267° C., as a yellow granular powder.

Example XXXIX

A mixture of 4.3 parts 1-chloro-4-phenoxybutane, 5.5 parts dl-4-(2,6-dioxo-3-phenyl-3-piperidyl)-piperidine, 5.3 parts sodium carbonate, a few crystals of potassium iodide in 100 parts 4-methyl-2-pentanone and 100 parts n-butanol is stirred and refluxed for sixty hours. After cooling, the reaction mixture is filtered twice and the filtrate is evaporated. The oily residue is dissolved in 24 parts acetone. After cooling overnight at 0° C. and scratching the chilled solution, a solid is obtained. This is filtered off and dried, yielding 3 parts crude product. This crop is recrystallized from 24 parts acetone. After cooling overnight at —15° C., dl-4-(2,6-dioxo-3-phenyl-3-piperidyl) - 1-(4-phenoxybutyl)-piperidine is obtained, melting point 147–148.6° C., as a white amorphous powder.

Example XL

A mixture of 3.9 parts 1-N-anilino-2-chloro-1-oxo-ethane, 5.5 parts dl-4-(2,6-dioxo-3-phenyl-3-piperidyl)-piperidine, 5.3 parts sodium carbonate, a few crystals of potassium iodide in 100 parts 4-methyl-2-pentanone and 100 parts n-butanol is stirred and refluxed for sixty hours. After cooling, 50 parts water are added. The organic layer is separated, dried over potassium carbonate and evaporated. The residue is dissolved in a mixture of 320 parts diisopropylether and 120 parts acetone. On keeping at room temperature, 1.6 parts product are filtered off (mixture of free base and its hydrochloride). Then gaseous hydrogen chloride is introduced into the mother liquor. The precipitated solid hydrochloride is filtered off and dried, yielding the product. This crop is boiled in 240 parts 4-methyl-2-pentanone. The undissolved part is filtered off and dried under reduced pressure, yielding dl-1-(2-N-anilinocarbonylmethyl)-4-(2,6-dioxo - 3 - phenyl-3-piperidyl)-piperidine hydrochloride, melting point 285–287° C. (dec.), as a white amorphous powder.

Example XLI

From 4.59 parts 2-chloro-methylpyridine hydrochloride, the free base is liberated as follows: It is dissolved in 450 parts chloroform. To this solution is added a mixture of 250 parts potassium carbonate and 200 parts water. The whole is warmed for one hour at 40° C. and filtered. The organic layer is dried over potassium carbonate, filtered and evaporated. The oily residue, together with 5.5 parts dl-4-(2,6-dioxo-3-phenyl-3-piperidyl)-piperidine, 5.4 parts sodium carbonate, a few crystals of potassium iodide in 100 parts 4-methyl-2-pentanone and 100 parts n-butanol is stirred and refluxed for sixty hours. After cooling, 50 parts water are added. The organic layer is separated, dried over potassium carbonate, filtered and gaseous hydrogen chloride is introduced into the filtrate. A semisolid hydrochloride is obtained. The solvent is decanted and the residue solidifies on scratching in a mixture of 80 parts acetone and 40 parts 2-propanol. After cooling for one hour at 0° C., the product is filtered off. This crop is recrystallized from a mixture of 16 parts acetone, 100 parts 2-propanol and 10 parts water. After cooling for two days at 0° C., some oil is precipitated. The supernatant solution is decanted and evaporated. The solid residue is recrystallized from 24 parts warm 2-propanol to yield the product. This crop is recrystallized once more from a mixture of 60 parts 2-propanol and 7 parts water. After cooling for two days at 0° C., dl-4-(2,6-dioxo-3-phenyl-3-piperidyl)-1-(2-pyridylmethyl)-piperidine dihydrochloride is obtained, melting point 247–254° C., as a white amorphous powder.

*Example XLII*

A few drops of a solution of 2 parts sodium in 32 parts ethanol are added to a solution of 72.5 parts dl-1-benzyl-4-(α-cyano-benzyl)-piperidine, 15 parts acrylonitrile, and 150 parts 1,4-dioxane at room temperature (temperature rises 2° to 3° C.). This addition is repeated a few times until a temperature of 30° C. is obtained. By a further addition of a few drops of sodium ethoxide the temperature rises to 55° to 60° C. While maintaining this temperature (on cooling with a water bath) the remaining sodium ethoxide solution is added dropwise. After the addition is complete, the whole is cooled to room temperature and filtered. To the filtrate are added 100 parts water and the whole is extracted with ether. The organic layer is washed twice with water, dried over $K_2CO_3$, filtered and HCl gas is introduced into the filtrate. A sticky hydrochloride is obtained which solidifies on standing overnight. It is filtered off and triturated in acetone, yielding less pure dl - 1 - benzyl-4-(1,3-dicyano-1-phenylpropyl)-piperidine hydrochloride, melting point 227–232° C.

A sample of 3.5 parts of this crop is dissolved in a boiling mixture of 80 parts isopropanol and 40 parts methanol and filtered. After cooling for three hours at —20° C., dl - 1-benzyl-4-(1,3-dicyano-1-phenylpropyl)-piperidine hydrochloride is obtained, melting point 231.8–241.4° C., grey-white granular powder.

*Example XLIII*

A few drops of a solution of 1.4 parts sodium in 28 parts ethanol are added to a solution of 67.3 parts dl-1-benzyl - 4 - (α-cyano-4-methoxybenzyl)-piperidine, 11.5 parts acrylonitrile and 92 parts 1,4-dioxane at room temperature (temperature rises to 45° C.). The remaining sodium ethoxide solution is added, while maintaining this temperature. After cooling the reaction mixture, 75 parts water are added and the whole is extracted with 400 parts ether. The aqueous layer is extracted twice with ether. The combined organic layers are dried over $K_2CO_3$ and HCl gas is introduced into it. A sticky hydrochloride is obtained. The ether is decanted and set aside. The residue is dissolved in a boiling mixture of 80 parts acetone and 16 parts isopropanol. After cooling to —20° C., dl-1-benzyl-4-[1,3-dicyano-1-(4-methoxyphenyl)-propyl]-piperidine hydrochloride is filtered off, melting point 248–250° C. The etheric filtrate, which was set aside is evaporated. The oily residue is boiled together with the filtrate of the first crop (acetone and isopropanol). After cooling overnight at —20 C., dl-1-benzyl-4-[1,3 - dicyano - 1-(4-methoxyphenyl)-propyl]-piperidine hydrochloride is obtained, melting point 220–225.5° C. On further cooling the filtrate, a third fraction of less pure dl - 1 - benzyl-4-[1,3-dicyano-1-(4-methoxyphenyl)-propyl]-piperidine hydrochloride is obtained, melting point 193–197° C.

*Example XLIV*

A few drops of a solution of 3.6 parts sodium in 60 parts ethanol are added dropwise to a solution of 166.6 parts dl-1-benzyl-4-(α-cyano-3-methylbenzyl)-piperidine, 32 parts acrylonitrile and 240 parts 1,4-dioxane (no exothermic reaction). The whole is heated to 40° C. When this temperature is reached the remaining sodium ethoxide solution is added dropwise (slightly exothermic reaction: temperature rises from 45° to 50° C.). After cooling, 100 parts water are added and the whole is extracted with 480 parts ether. The aqueous layer is separated and extratced once more with ether (2×160 parts). The combined organic layers are dried over $K_2CO_3$ and HCl gas is introduced into it. An oily hydrochloride is obtained, which solidifies on scratching. It is filtered off, washed with acetone, filtered off again and dried, yielding dl - 1-benzyl-4-[1,3-dicyano-1-(3-methylphenyl)-propyl]-piperidine hydrochloride, melting point 221–223.5° C., as a white amorphous powder.

*Example XLV*

From 68 parts dl-1-benzyl-4-(α-cyano-4-methylbenzyl)-piperidine hydrochloride the free base is liberated in the usual manner. After extraction with ether, the organic layer is evaporated. To this residue are added 11.6 parts acrylonitrile in 160 parts 1,4-dioxane. Then there are added a few drops of a solution of 2.5 parts sodium in 44 parts ethanol (exothermic reaction: temperature rises from 23° to 35° C.). The remaining sodium ethoxide solution is added at such a rate that the temperature is maintained. After the addition is complete, the whole is stirred at room temperature. The reaction mixture is divided between 100 parts water and 240 parts ether. The aqueous layer is separated and extracted once more with ether. The combined organic layers are dried over $K_2CO_3$, filtered and HCl gas is introduced into the filtrate. An oily hydrochloride is obtained. The ether is decanted and the oily residue solidifies on scratching in acetone, yielding dl-1-benzyl-4-[1,3-dicyano-1-(4-methylphenyl)-propyl]-piperidine hydrochloride, melting point 223–226° C., as a white powder.

*Example XLVI*

To a stirred solution of 7.9 parts dl-1-(4-chlorobenzyl)-4-(α-cyano-benzyl)-piperidine, 14.2 parts acrylonitrile and 160 parts 1,4-dioxane is added dropwise a solution of sodium ethoxide, prepared from 3.2 parts sodium in 50 parts ethanol, while maintaining a temperature at 50° C. (exothermic reaction). After being cooled to room temperature, the reaction mixture is treated with 70 parts water and extracted with 2×300 parts diethylether. The combined ether extracts are dried twice over $K_2CO_3$, filtered and saturated with dry HCl gas. An oil separates which solidifies on cooling. The resulting slurry is evaporated to dryness, and the residue dissolved in a mixture of 120 parts acetone and 40 parts isopropanol. On cooling to 0° C. for one hour, a white solid precipitates which, after being filtered off and dried under reduced pressure consists of dl-1-(4-chloro-benzyl)-4-(1,3-dicyano-1-phenylpropyl)-piperidine hydrochloride, melting point 250–255° C., a light tan amorphous powder.

A second crop of less pure dl-1-(4-chloro-benzyl)-4-(1,3-dicyano-1-phenylpropyl)-piperidine hydrochloride, melting point 248–252° C., is obtained on evaporation of the mother liquors to dryness and treatment of the resulting residue with 50 parts acetone.

*Example XLVII*

To a mixture of 40.7 parts dl-1-benzyl-4-(α-cyano-4-ethylbenzyl)-piperidine, 7.4 parts acrylonitrile and 80 parts 1,4-dioxane are added some drops of a solution of 1 part sodium in 20 parts ethanol, at a temperature of about 45° C. After the exothermic reaction has started, the remainder of the sodium ethoxide solution is added dropwise, while maintaining a temperature of 45–50° C. After the addition is complete, the whole is stirred for five minutes at the same temperature. After cooling, 70 parts water are added dropwise and the whole is extracted with ether (2×560 parts). The organic layer is separated, dried over potassium carbonate and gaseous hydrochloric acid is introduced into it. An oily hydrochloride is obtained. The ether is decanted and the oily residue solidifies on scratching in acetone, yielding dl-1-benzyl - 4 - [1,3-dicyano-1-(4-ethylphenyl)-propyl]-piperidine hydrochloride, melting point 222–228° C., as a pale yellow granular powder.

On standing of the mother liquor overnight at room temperature, a second fraction of less pure dl-1-benzyl-4 - [1,3 - dicyano - 1 - (4 - ethylphenyl) - propyl] - piperidine hydrochloride is obtained, melting point 190–213° C.

Example XLVIII

To a mixture of 10.9 parts dl-1-benzyl-4-(α-cyano-3,4-dimethylbenzyl)-piperidine, 1.7 parts acrylonitrile and 20 parts dioxane is added dropwise a sodium ethoxide solution, prepared from 0.5 part sodium in 14 parts ethanol, at a temperature of 50° C. (slightly exothermic reaction). After the addition is complete, the whole is stirred for thirty minutes at the same temperature. There are then added 50 parts water. The whole is extracted twice with 200 parts ether. The organic layer is dried over potassium carbonate and gaseous hydrochloric acid is introduced into it. An oily hydrochloride is obtained. The solvent is decanted and evaporated. The residue, together with the oily hydrochloride, is scratched in 80 parts acetone, yielding dl-1-benzyl-4-[1,3-dicyano-1-(3,4-dimethylphenyl)-propyl]-piperidine hydrochloride, melting point 229–249° C.

Example XLIX

From 25 parts dl-1-benzyl-4-(cyano-2-pyridylmethyl)-piperidine dihydrochloride the free base is liberated in the usual manner and extracted with ether. The organic layer is separated, dried and evaporated. To this residue are added 3.5 parts acrylonitrile and 160 parts 1,4-dioxane and kept at room temperature. Then there is added dropwise a solution of 1 part sodium in 12 parts ethanol (exothermic reaction: temperature rises from 22° to 40° C.). After the addition is complete, the whole is heated for one and one-half hours at 50° C. After cooling to room temperature, the reaction mixture is divided between 50 parts water and 240 parts ether. The aqueous layer is separated and extracted once more with 160 parts ether. The combined organic layers are dried over potassium carbonate, filtered and gaseous hydrogen chloride is introduced into the filtrate. A dark oily hydrochloride is obtained. The whole is evaporated. The dark oily residue is dissolved in 200 parts boiling water and the obtained solution is treated with activated charcoal and filtered while hot. The filtrate is cooled, alkalized with ammonium hydroxide and extracted twice with 240 parts ether. The organic layer is dried over potassium carbonate, filtered and gaseous hydrogen chloride is introduced into the filtrate. The precipitated hydrochloride is filtered off and dried to yield dl-1-benzyl-4-[1,3 - dicyano - 1-(2-pyridyl)-propyl]-piperidine dihydrochloride, melting point 140–152° C.

Example L

A mixture of 6.2 parts 1-chloro-2-phenylethane, 10.15 parts dl - 4-(1,3-dicyano-1-phenylpropyl) - piperidine, 6.4 parts sodium carbonate, a few crystals of potassium iodide in 400 parts 4-methyl-2-pentanone is stirred and refluxed for forty-five hours. After cooling 100 parts water are added. The organic layer is separated, dried over $K_2CO_3$ and evaporated. The oily residue is dissolved in a mixture of 240 parts diisopropylether and 40 parts chloroform. The organic layer is dried over $K_2CO_3$ and HCl gas is introduced into it. The precipitated hydrochloride is filtered off and dried to yield the crude product. This crop is boiled in a mixture of 100 parts isopropanol and 32 parts acetone. The undissolved part is filtered off, yielding dl-4-(1,3-dicyano-1-phenylpropyl)-1-(2-phenylethyl)-piperidine hydrochloride, melting point 254.2–271.7° C.

Example LI 10 parts of a solution of 1 part sodium in 20 parts ethanol absolute is added dropwise to a solution of 27 parts dl-4-(cyanobenzyl)-1-methylpiperidine, 7.5 parts acrylonitrile in 75 parts 1,4-dioxane (exothermic reaction: temperature rises to 45° C.). The whole is cooled to 20° C. and the remaining part of sodium ethoxide is further added dropwise (temperature rises from 20° to 27° C.). After the addition is complete, 50 parts water and 240 parts ether are added. The aqueous layer is separated and extracted twice with ether. The combined etheric layers are washed twice with water, dried over $K_2CO_3$ and HCl gas is introduced into the solution. A sticky hydrochloride is obtained, which solidifies on treating with acetone, yielding the product. The crop is recrystallized from 100 parts methanol. After keeping at room temperature, dl-4-(1,3-dicyano-1-phenylpropyl)-1-methylpiperidine hydrchloride is filtered off, melting point 278–280.8° C., as a white powder. After cooling the filtrate at 0° C., a second fraction of dl-4-(1,3-dicyano-1-phenylpropyl)-1-methylpiperidine hydrochloride is obtained, melting point 275–279° C.

Example LII

To a solution of 600 parts glacial acetic acid and 300 parts concentrated sulfuric acid are added 63.5 parts dl-4-(1,3-dicyano-1-phenylpropyl)-piperidine at a temperature of <20° C. The whole is heated to 125° C. in the cousre of thirty-five minutes and stirring is continued for another twenty minutes while maintaining this temperature. The reaction mixture is cooled to 20° C., poured into 900 parts ice, alkalized with $NH_4OH$ at a temperature of <25° C. (while cooling with ice) and extracted with 3000 parts chloroform. The organic layer is washed first twice with 400 parts of a 5% of $K_2CO_3$ solution and then twice with 400 parts water. The organic layer is dried over $MgSO_4$, filtered and evaporated. The solid residue is filtered off and the filtrate is set aside. The precipitate is stirred in 320 parts acetone, filtered off and dried, yielding dl-4-(2,6-dioxo-3-phenyl-3-piperidyl)-piperidine, melting point 225–226.5° C.

The filtrate which was set aside is concentrated together with the acetone filtrate to a volume of about 100 parts, yielding a second fraction of dl-4-(2,6-dioxo-3-phenyl-3-piperidyl)-piperidine, melting point 206.2–218.8° C.

Exampule LIII

To a solution of 575 parts glacial acetic acid and 287.5 parts concentrated sulfuric acid are added 62.5 parts dl-4-[1,3-dicyano-1-(4-fluoro-phenyl)-propyl]-piperidine at a temperature of <20° C. The whole is heated to 125° C. in the course of eighteen minutes and stirring is continued for another ten minutes while maintaining this temperature. The reaction mixture is cooled to 23° C., poured into 500 parts ice, alkalized with $NH_4OH$ at a temperature of 20° C. (while cooling with ice). The aqueous layer is extracted with 5000 parts chloroform. The organic layer is separated, washed with 1000 parts of a 5% $K_2CO_3$ solution. During this manipulation a solid precipitate is formed. This is filtered off and the filtrate is set aside. The filter cake is dissolved in 3000 parts boiling chloroform. Then $Na_2SO_4$ is added to the hot solution and the whole is filtered and evaporated, yileding two fractions, (a) dl-4-[2,6-dioxo-3-(4-fluoro-phenyl)-3-piperidyl]-piperidine, melting point 241–242.5° C., as a white amorphous powder and (b) less pure dl-4-[2,6-dioxo-3-(4-fluoro-phenyl)-3-piperidyl]-piperidine, melting point 232–234.5° C.

From the filtrate (chloroform) which was set aside, the chloroform layer is separated, washed with 400 parts water, dried over $Na_2SO_4$, filtered and evaporated, yielding a third fraction of less pure dl-4-[2,6-dioxo-3-(4-fluorophenyl) - 3 - piperidyl] - piperidine, melting point 226.2–234° C.

Example LIV

To a solution of 730 parts glacial acetic acid and 365 parts concentrated sulfuric acid are added 79.8 parts dl-4-[1,3-dicyano-1-(3-methylphenyl)-propyl]-piperidine at a temperature of <20° C. The whole is heated to 130° C. in the course of fifteen minutes. The reaction mixture is cooled to 20° C. and poured into 700 parts crushed ice, alkalized with $NH_4OH$ at a temperature of <25° C. and then extracted twice with 3000 parts chloroform. The organic layer is separated, washed twice with a 5% $K_2CO_3$ solution and twice with 500 parts water, dried over $Na_2SO_4$ and evaporated. The oily residue solidifies on evaporating in acetone. The obtained solid is triturated in acetone, yielding dl-4-[2,6-dioxo-3-(3-methylphenyl)-3-piperidyl]-piperidine melting point 190.4–193.2° C., as a pale yellow powder.

The mother liquor is evaporated and the residue is triturated in acetone, yielding a second fraction of dl-4-[2,6-dioxo-3-(3-methylphenyl)-3 - piperidyl] - piperidine, melting point 185–191.5° C.

Example LV

To a stirred mixture of 5.5 parts dl-4-(2.6-dioxo-3-phenyl-3-piperidyl)-piperidine, 6.4 parts sodium carbonate, a few crystals of potassium iodide in 80 parts 4-methyl-2-pentanone and 80 parts n-butanol is added dropwise a solution of 5 parts 1-N-anilino-2-bromo-ethane in 20 parts 4-methyl-2-pentanone and 20 parts n-butanol. After the addition is complete, the whole is stirred and refluxed for sixty hours. After cooling, 50 parts water are added. The organic layer is separated, dried over potassium carbonate, filtered and evaporated. The oily residue is crystallized from a boiling mixture of 20 parts acetone and 80 parts diisopropylether, yielding the product. The crop is dissolved in 90 parts boiling acetone. After keeping overnight at room temperature, the product is obtained. This crop is dissolved in 120 parts methanol and this solution is filtered. To this filtrate is added a solution of 2.6 parts oxalic acid dihydrate in 40 parts methanol. The whole is concentrated to a volume of about 125 parts. After keeping this solution for two days at room temperature, impure dl-1-(2-N-anilino-ethyl)-4-(2,6-dioxo-3-phenyl-3-piperidyl)-piperidine dioxalate is obtained. On further keeping the filtrate for forty-eight hours at room temperature, dl-1-(2-N-anilino-ethyl)-4-(2,6-dioxo-3-phenyl-3-piperidyl)-piperidine dioxalate is obtained, melting point 99.2–143° C. (dec.), as a white flaky powder.

Example LVI

A mixture of 2.6 parts 1,2-epoxyethyl benzene, 5.5 parts dl-4-(2,6-dioxo-3-phenyl-3-piperidyl)-piperidine and 80 parts anhydrous xylene is stirred and refluxed for sixty hours. The reaction mixture is evaporated. The solid residue is washed with acetone and dried, yielding the product. The crop is boiled in a mixture of 64 parts acetone and 60 parts chloroform. The undissolved part is filtered off, yielding the product. After cooling this filtrate overnight at −20° C., crude dl-4-(2,6-dioxo-3-phenyl - 3 - piperidyl) - 1 - (2 - hydroxy - 2 - phenylethyl)-piperidine is filtered off. This crop is boiled once more in 32 parts acetone. The undissolved part is filtered off and after cooling the filtrate overnight at −20° C., dl-4-(2,6-dioxo-3-phenyl-3-piperidyl)-1-(2-hydroxy-2-phenylethyl)-piperidine is obtained, melting point 210.2–215.4° C., as a white amorphous powder.

Example LVII

A mixture of 3.4 parts 1-benzoyl-2-chloro-ethane, 10.9 parts dl-4-(2,6-dioxo-3-phenyl-3-piperidyl)-piperidine, a few crystals of potassium iodide in 100 parts anhydrous toluene is heated in a sealed tube for seventy-two hours at 120° C. After cooling to room temperature, dl-4-(2,6-dioxo-3-phenyl-3-piperidyl)-piperidine hydrochloride is filtered off. On keeping the filtrate at room temperature, a precipitate is formed, yielding dl-1-(2-benzoyl-ethyl)-4-(2,6-dioxo-3-phenyl-3-piperidyl)-piperidine, melting point 103–110° C., as a white amorphous powder.

What is claimed is:

1. A member selected from the group consisting of 1-R$_1$-4-(2,6-dioxo-3-R$_2$-3-piperidyl)-piperidine and therapeutically active, nontoxic acid addition salts, where R$_1$ is a member of the group consisting of benzyl, lower alkyl from 1 to 7 carbons, cinnamyl, phenyl-but-3-methyl, thienyl-alk, N-anilino-carbonyl-alk, pyridyl-alk, N-anilino-alk, phenyl-alk, phenyl-hydroxy-alk, halo-benzyl, halo-benzyl-alk, phenoxy-alk, benzoyl-alk, alk-benzyl, di-alk-benzyl, alko-phenoxy-alk and alk-phenoxy-alk; and R$_2$ is a member of the group consisting of phenyl, alko-phenyl, alk-phenyl, di-alk-phenyl, pyridyl and halo-phenyl, wherein alk is lower alkyl of 1 to 4 carbon atoms, alko is lower alkoxy of 1 to 4 carbon atoms and halo is a member of the group consisting of chloro, bromo, fluoro and iodo.

2. 1-(2-thienyl-lower alkyl)-4-(2,6-dioxo-3-phenyl-3-piperidyl)-piperidine.

3. 1-(2-pyridyl-lower alkyl)-4-(2,6-dioxo-3-phenyl-3-piperidyl)-piperidine.

4. 1-phenyl-lower alkyl-4-(2,6-dioxo-3-phenyl-3-piperidyl)-piperidine.

5. 1 - halo - benzyl - 4 - (2,6 - dioxo - 3 - phenyl - 3 - piperidyl)-piperidine.

6. 1-halo-benzyl-lower alkyl-4-(2,6-dioxo-3-phenyl-3-piperidyl)-piperidine.

7. 1-phenoxy-lower alkyl-4-(2,6-dioxo-3-phenyl-3-piperidyl)-piperidine.

8. 1-benzoyl-lower alkyl-4-(2,6-dioxo-3-phenyl-3-piperidyl)-piperidine.

9. 1-lower alkyl-benzyl-4-(2,6-dioxo-3-phenyl-3-piperidyl)-piperidine.

10. 1-di-lower alkyl-benzyl-4-(2,6-dioxo-3-phenyl-3-piperidyl)-piperidine.

11. 1-lower alkoxy-phenoxy-lower alkyl-4-(2,6-dioxo-3-phenyl-3-piperidyl)-piperidine.

12. 1-lower alkyl-phenoxy-lower alkyl-4-(2,6-dioxo-3-phenyl-3-piperidyl)-piperidine.

13. 1 - benzyl - 4 - (2,6 - dioxo - 3 - phenyl - 3 - piperidyl)-piperidine-hydrochloride.

14. dl - 4 - (2,6 - dioxo - 3 - phenyl - 3 - piperidyl) - 1 - (4-methyl-benzyl)-piperidine hydrochloride.

15. dl - 1 - benzyl - 4 - [2,6 - dioxo - 3 - (4 - methylphenyl)-3-piperidyl]-piperidine-hydrochloride.

16. dl - 4 - (2,6 - dioxo - 3 - phenyl - 3 - piperidyl) - 1 - (2-pyridyl-methyl)-piperidine dihydrochloride.

17. dl - 1 - (3 - chloro - benzyl) - 4 - (2,6 - dioxo - 3- phenyl-3-piperidyl)-piperidine hydrochloride.

18. dl - 1 - benzyl - 4 - [3 - (3,4 - dimethyl - phenyl) - 2, 6-dioxo-3-piperidyl]-piperidine hydrochloride.

19. dl - 4 - (2,6 - dioxo - 3 - phenyl - 3 - piperidyl) - 1 - (4-fluoro-benzyl)-piperidine hydrochloride.

20. dl - 4 - (2,6 - dioxo - 3 - phenyl - 3 - piperidyl) - 1 - (2-thienyl-methyl)-piperidine hydrochloride.

21. dl - 4 - (2,6 - dioxo - 3 - phenyl - 3 - piperidyl) - 1 - methyl-piperidine hydrochloride.

22. dl - 4 - (2,6 - dioxo - 3 - phenyl - 3 - piperidyl) - 1 - (3-phenoxy-propyl)-piperidine.

23. dl - 4 - (2,6 - dioxo - 3 - phenyl - 3 - piperidyl) - 1 - [3 - (4 - methoxy - phenoxy) - propyl] - piperidine - hydrochloride.

24. dl - 4 - (2,6 - dioxo - 3 - phenyl - 3 - piperidyl) - 1 - [3-(4-methyl-phenoxy)-propyl]-piperidine hydrochloride.

25. dl - 4 - (2,6 - dioxo - 3 - phenyl - 3 - piperidyl) - 1 - (4-phenyl-but-3-enyl)-piperidine.

26. dl - 4 - (2,6 - dioxo - 3 - phenyl - 3 - piperidyl) - 1 - (4-phenoxy-butyl)-piperidine.

References Cited in the file of this patent

UNITED STATES PATENTS 2,749,346    Hoffmann et al. _____ June 5, 1956

UNITED STATES PATENT OFFICE
CERTIFICATE OF CORRECTION

Patent No. 3,125,578　　　　　　　　　　　　March 17, 1964

Paul Adriaan Jan Janssen

It is hereby certified that error appears in the above numbered patent requiring correction and that the said Letters Patent should read as corrected below.

Column 3, line 68, for "mixtuse" read -- mixture --; line 70, for "rom" read -- room --; column 4, line 3, for "-pnenyl-propyl)-" read -- -phenylpropyl)- --; column 11, line 8, for "hydrochlorine" read -- hydrochloride --; column 18, line 18, for "cousre" read -- course --; line 52, for "yileding" read -- yielding --; column 19, line 11, for "dl-4-(2.6-dioxo-3-" read -- dl-4-(2,6-dioxo-3- --.

Signed and sealed this 28th day of July 1964.

(SEAL)

Attest:

ESTON G. JOHNSON
Attesting Officer

EDWARD J. BRENNER
Commissioner of Patents